United States Patent [19]

Ridgeway

[11] 3,965,616
[45] June 29, 1976

[54] LOCKABLE VEGETATION POT AND SAUCER

[76] Inventor: John C. Ridgeway, 4216 Brookway Lane, Brooklyn, Ohio 44144

[22] Filed: Dec. 30, 1974

[21] Appl. No.: 537,242

[52] U.S. Cl. ............................. 47/34 R; 206/520; 206/423; 220/69
[51] Int. Cl.² ........................................ A01G 9/02
[58] Field of Search ............ D35/3 R; 47/34, 34.1, 47/34.2, 34.3, 34.4, 38, 35 X, 38.1; 220/69; 248/346; 217/36; 206/423, 519, 520

[56] References Cited

UNITED STATES PATENTS

| | | | |
|---|---|---|---|
| 864,556 | 8/1907 | Reiter | 220/69 |
| 899,031 | 9/1908 | Davis | 248/346 |
| 964,196 | 7/1910 | Aul | 47/34.2 |
| 1,007,319 | 10/1911 | Williams | 217/36 |
| 1,391,353 | 9/1921 | Wells | 47/34.2 |
| 1,896,229 | 2/1933 | Ellis | 47/34.2 |
| 2,140,862 | 12/1938 | Sumner | 47/34.4 |
| 2,344,794 | 3/1944 | Vallinos | 47/34.1 |
| 2,504,031 | 4/1950 | Manning | 47/34.2 |
| 2,514,269 | 7/1950 | Wilberschied | 47/38.1 |
| 2,605,588 | 8/1952 | Lindstaedt | 47/35 X |
| 2,854,790 | 10/1958 | Hartung | 47/34 |
| 3,027,684 | 4/1962 | Keiding | 47/38 |
| 3,339,310 | 9/1967 | Solomon | 47/34 |
| 3,785,088 | 1/1974 | Guarriello | 47/34 |
| 3,800,469 | 4/1974 | Lau, Jr. et al. | 47/34 |
| D194,000 | 11/1962 | Adams et al. | D35/3 R |

FOREIGN PATENTS OR APPLICATIONS

| | | | |
|---|---|---|---|
| 201,968 | 5/1956 | Australia | 47/38 |
| 289,885 | 10/1965 | Australia | 47/38.1 |
| 86,168 | 9/1958 | Denmark | 47/38 |
| 543,387 | 1/1932 | Germany | 47/38 |
| 108,099 | 8/1943 | Sweden | 47/34.2 |
| 214,159 | 4/1924 | United Kingdom | 47/34.2 |

Primary Examiner—Edgar S. Burr
Assistant Examiner—James R. Feyrer
Attorney, Agent, or Firm—Woodling, Krost, Granger, & Rust

[57] ABSTRACT

A lockable vegetation pot and saucer is disclosed comprising a plastic pot having a pot base and integral pot sides diverging from the pot base. The pot has a plurality of pot stops extending from the inside surface of the pot sides. The angle of the diverging pot sides enables stacking of the pot with similar pots when the pot base engages the pot stops of an adjacent similar pot. A plurality of locking apertures are located in the pot sides each aperture having a locking side adjacent the pot base. The invention includes a plastic saucer having a saucer base and integral saucer sides diverging from the saucer base. The saucer has a plurality of saucer stops extending from the inside surface of the saucer. The angle of the diverging saucer sides enables stacking of the saucer with similar saucers when the saucer base engages the saucer stops of an adjacent similar saucer. The saucer includes a plurality of tabs extending inwardly from the inside surface of the saucer with each tab having a ramp surface and a locking surface whereby the ramp surfaces cause progressive deformation of the saucer upon insertion of the pot into the saucer until the locking surfaces of the tabs engage the locking sides of the locking apertures and thereby resiliently hold the pot against the saucer base.

5 Claims, 14 Drawing Figures

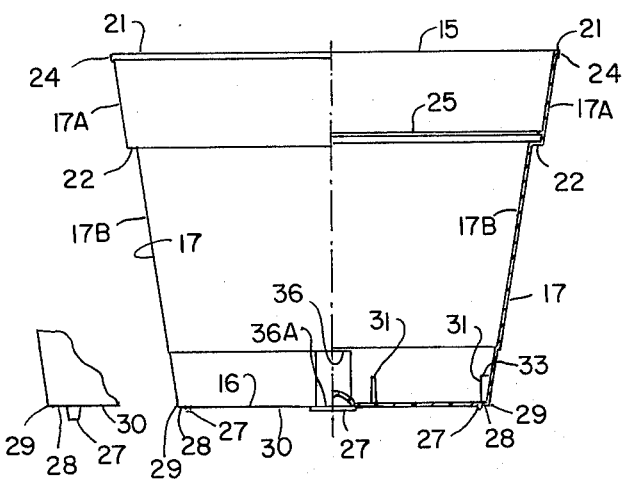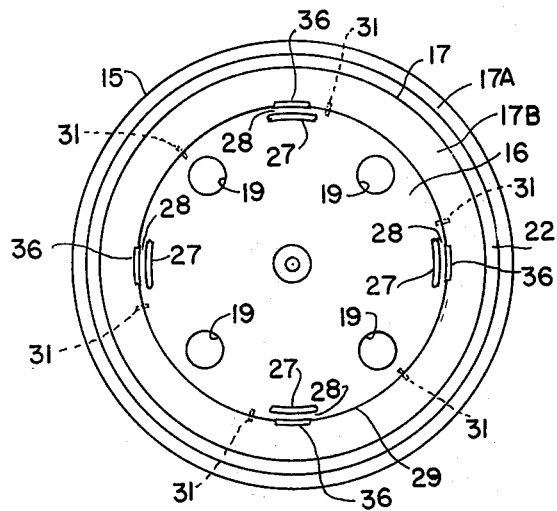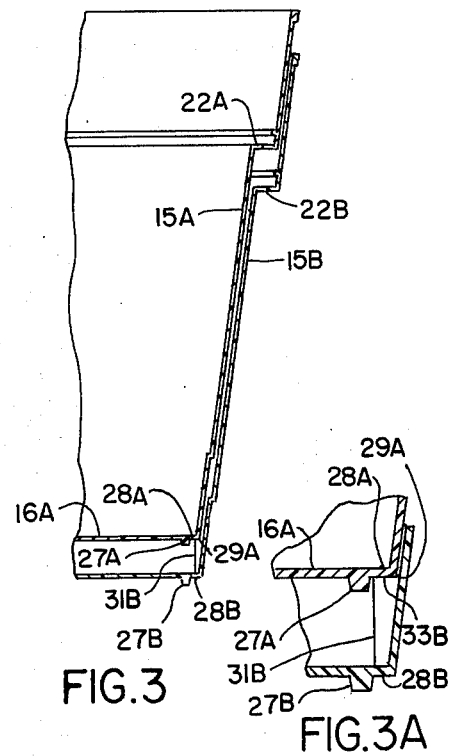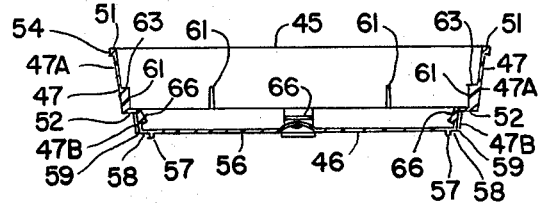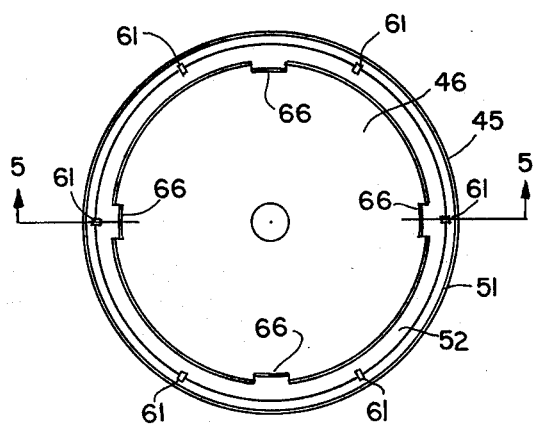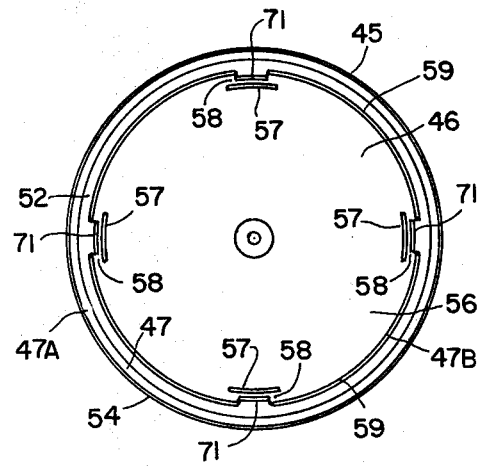

LOCKABLE VEGETATION POT AND SAUCER

The foregoing abstract is merely a resume of one general application, is not a complete discussion of all principles of operation or applications, and is not to be construed as a limitation on the scope of the claimed subject matter.

BACKGROUND OF THE INVENTION

1. Field of the Invention

The invention relates to plant husbandry, plant receptacles with irrigators.

2. Description of the Prior Art

Various types of self-irrigating flower pots and vases have been available to the prior art. The pots and irrigating saucers have been made of various materials and have appeared in various shapes for different uses including placement on a horizontal surface or suspension from a ceiling. In many cases a bayonet coupling was used to secure a saucer to a pot in which case the pot has a protruding element which would cooperate with a curved slot in the saucer. Some in the prior art utilize a centerhole in the bottom of the pot to receive a threaded fastener to expand a rubber grommet and fasten the pot to a saucer upon application of pressure by the threaded fastener. Others in the prior art used a friction coupling between a pot and a saucer to enable a locking engagement therebetween. Others in the prior art illustrate a plant receptacle having improved drainage means including a plurality of drain holes located on the sides of the pot. Various other patents illustrate the stacking for shipping containers for plant life.

Several patents disclose pots and saucers made from plastic materials. An object of this invention is to provide a pot and saucer combination made of a deformable resilient plastic material having integral locking means for locking the pot to the saucer.

Another object of this invention is to provide a pot and saucer combination which may be easily locked and unlocked without damage to either of the components.

Another object of this invention is to provide a pot and saucer combination which is easily locked and unlocked in addition to providing a strong union between the pot and saucer.

Another object of this invention is to provide a pot and saucer combination with a locking device which may be used with existing pots having side drainage holes.

Another object of this invention is to provide a pot and saucer combination wherein the pots and saucers may be separately stacked for shipment.

SUMMARY OF THE INVENTION

The invention may be incorporated into a lockable vegetation pot and saucer, comprising in combination: a pot having a pot base and integral pot sides extending from said pot base; a plurality of locking apertures in said pot sides and adjacent said pot base; a saucer having a saucer base and integral saucer sides extending from said saucer base; and a plurality of tabs extending from an inside surface of said saucer for engaging said plurality of locking apertures to interlock said pot and saucer. Other objects and a fuller understanding of the invention may be had by referring to the following description and claims taken in conjunction with the accompanying drawings.

BRIEF DESCRIPTION OF THE DRAWINGS

FIG. 1 is a side view of a plastic vegetation pot, partly in section;

FIG. 1A is an enlarged partial view of FIG. 1;

FIG. 2 is a bottom view of the pot shown in FIG. 1;

FIG. 3 is a partial sectional view of a plurality of stacked pots similar to the pot shown in FIGS. 1 and 2;

FIG. 3A is an enlarged partial view of FIG. 3;

FIG. 4 is a top view of a saucer;

FIG. 5 is a longitudinal sectional view of the saucer shown in FIG. 4;

FIG. 6 is a bottom view of the saucer shown in FIGS. 4 and 5;

DESCRIPTION OF THE PREFERRED EMBODIMENT

Figure 7:
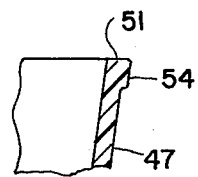
FIG. 7 is an enlarged sectional view of a portion of the sidewall of the saucer shown in FIGS 4–6.

FIGS. 1, 1A and 2 show a plastic vegetation pot 15 having a base 16 and integral sides 17 which diverge from the pot base 16. The base 16 includes a plurality of drain apertures 19 uniformly distributed in the pot base 16. Although the pot has been shown to be circular in FIGS. 1 and 2, the terms pot and saucer contemplate vegetation containers having various cross-sections including polygons, ellipses and the like.

A minor portion 17A of the pot sides 17 has an increased cross-sectional area extending to the top 21 of the pot sides 17 with a pot shoulder 22 extending between the minor portion 17A and a major portion 17B of the pot side 17. A pot rim 24 extends around the top 21 of the pot sides 17 and has an increased wall thickness to provide added strength at the top of the pot 15. A second rim 25 having an increased wall thickness extends about an inner surface of the pot sides 17 to add additional strength to the pot 15. A plurality of pot legs 27 are uniformly distributed about the pot base 16 and extend downwardly from a bottom surface 30 of the pot base 16 at a spaced distance 28 from the outer perimeter 29 of the pot base 16. A plurality of pot stops 31 are uniformly distributed about the pot base 16 and extend from the inside surface of the pot sides 17 a distance 33 which is less than the spaced distance 28 between the pot legs 27 and the outer perimeter 29 of the pot base 16. A plurality of retangular locking apertures 36 are uniformly distributed about the pot sides 17 with each locking aperture having a locking side 36A which is adjacent the pot base 16. The plurality of locking apertures 36 are respectively adjacent the plurality of pot legs 27.

FIGS. 3 and 3A show two similar stacked pots 15A and 15B to enable shipment of a plurality of pots in a small space. The angle of the diverging pot sides enables stacking of the pot 15A with the similar pot 15B with the pot base 16A of pot 15A engaging the pot stop 31B of pot 15B. The spaced distance 28A between the pot leg 27A and the outer perimeter 29A of pot 15A is greater than the distance 33B of the pot stop 31B from the pot side. Consequently, the pot stop 31B engages only the base 16A of the pot 15A and the pot stop 31B cannot engage the pot leg 27A of the pot 15A. The pots 15A and 15B are stacked with the shoulder 22A being separated from the shoulder 22B. The pot stops 31 have the function of longitudinally separating pots so that they do not become wedged together due to the conical or diverging sides. Without such stops a stack of pots could become so wedged together as to be difficult to separate or even may cause splitting of the bottom pot.

FIGS. 4, 5, and 6 are respectively top, side, and bottom views of a plastic saucer 45 having a saucer base 46 and integral saucer sides 47 diverging from the saucer base 46. A major portion 47A of the saucer sides 47 has an increased cross-sectional area extending to the top 51 of the saucer sides 47 with a saucer shoulder 52 extending between the major portion 47A and a minor portion 47B. A saucer rim 54 extends around the top 51 of the saucer sides 47 and has an increased wall thickness to add strength to the saucer sides 47. A plurality of saucer legs 57 extend from a bottom surface 56 of the saucer base 46 at a spaced distance 58 from the outer perimeter 59 of the saucer base 46. The saucer legs 57 are uniformly distributed about the saucer base 46. A plurality of saucer stops 61 extend from an inside surface of the saucer sides 47 at the saucer shoulder 52 a distance 63 which is less than the spaced distance 58 of the saucer legs 57. FIGS. 4 and 5 show a plurality of tabs 66 extending inwardly from the inside surface of the saucer wall 47 having a length parallel to the saucer base 46 commensurate with the length of the locking sides 36A of the rectangular apertures 36. The tabs 66 extend inwardly from the inside surface of the saucer wall 47 and from detents 71 on the outside surface of the saucer wall 47. The tabs 66 are disposed adjacent to the saucer legs 57 as shown in FIG. 6.

FIG. 7 is an enlarged sectional view of a portion of the saucer sides 47 showing the increased wall thickness of the saucer rim 54 extending to the top 51 of the saucer sides 47.

Figure 8:
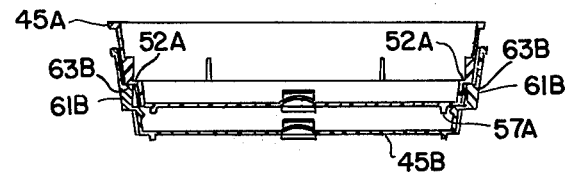
FIG. 8 is a partial sectional view of a plurality of stacked saucers similar to the saucers shown in FIGS 4–6.

FIG. 8 shows two similar saucers 45A and 45B being stacked to enable shipment of a plurality of saucers in a small space. The angle of the diverging saucer sides enables stacking of saucer 45A within similar saucer 45B with the saucer shoulder 52A engaging the saucer stops 61B of saucer 45B. The distance 63B of the saucer stop 61B of pot 45B is less than the length of the saucer shoulder between the major and the minor portions of the saucer sides. Consequently the saucer stops 61B engage only the saucer shoulder 52A. The stacked position of the saucers 45A and 45B is similar to the stacked position of the pots 15A and 15B shown in FIG. 3, and again the stops 61 prevent wedging together or splitting of the stacked saucers. The stacked saucers 45A and 45B shown in FIG. 8 may be stacked within the stacked pots 15A and 15B shown in FIG. 3 for shipping stacked saucers with stacked pots to save additional shipping space. The angle of the diverging saucer sides 47. is substantially equal to the angle of the diverging pot sides 17 to enable the aforementioned cooperation.

Figure 9:
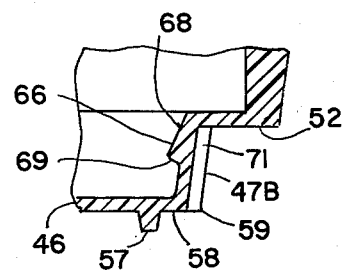
FIG. 9 is an enlarged sectional view of a portion of the saucer shown in FIG. 5.

FIG. 9 is an expanded sectional view of a portion of the saucer in FIG. 5 showing in greater detail the tab 66 having a ramp surface 68 and a locking surface 69. The ramp surface 68 extends upwardly and outwardly relative to the saucer base 46 whereas the locking surface 69 extends downwardly and outwardly at a greater angle than the ramp surface 68. The tabs 66 are pressed or formed in the minor sides 47B as shown by the detents 71. In one embodiment of the invention as actually constructed, angles of about 25° and 45° to the longitudinal axis were found satisfactory for the ramp and locking surfaces 68 and 69, respectively.

Figure 10:
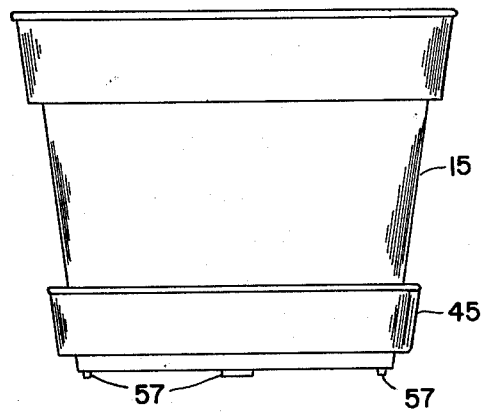
FIG. 10 is a side view of the interlocked pot and saucer combination.

FIG. 10 is a side view of the interlocking pot 15 and saucer 45 mounted in the upright position with the saucer legs 57 supporting the structure.

Figure 11:
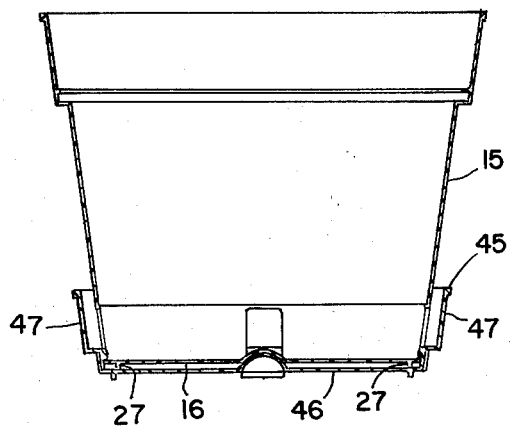
FIG. 11 is a longitudinal sectional view of the interlocked pot and saucer combination.

FIG. 11 is a sectional view of the interlocking pot 15 and saucer 45 assembly shown in FIG. 10. The pot base 16 is spaced from the saucer base 46 by the pot legs 27 to allow drainage to the saucer 45 through the drain holes 19 and apertures 36 enabling irrigation thereby. When the pot 15 is inserted into the saucer 45 the ramp surfaces 66 cause a progressive deformation of the saucer sides 47 until the locking surfaces 69 of the tabs 66 engage the locking sides 36A of the locking apertures 36. The saucer substantially returns to the original shape while resiliently holding pot legs 27 against the top surface of the saucer base 46. The engagement between the locking surfaces 69 and the locking side 36A of the locking aperture 36A is more fully shown in FIG. 12.

Figure 12:
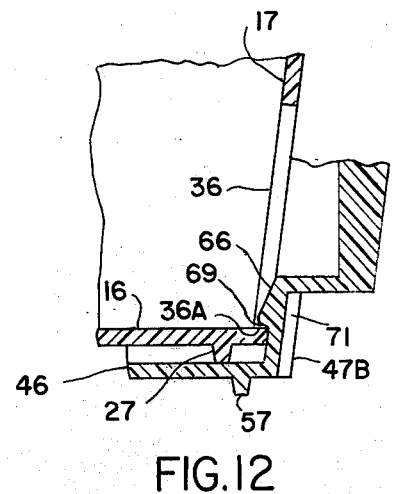
FIG. 12 is an enlarged sectional view of a portion of the interlocked pot and saucer combination shown in FIG. 11.

FIG. 12 is a magnified view of the engagement between the locking surface 69 and the locking side 36A which resiliently urges the pot legs 27 towards the top surface of the saucer base 46. The locking side 36A includes a portion of the pot base 16 since the locking aperture 36 extends substantially to the pot base 16.

The invention has been described as a vegetation pot and saucer which may either have cross-section that may be circular, a polygon, or the like comprising in combination; a pot 15 having a pot base 16. A plurality of locking apertures 36 are located in the pot sides 17 adjacent the pot base 16. A saucer 45 has a saucer base 46 and integral saucer sides 47 extending from the saucer base 46 for engagement with the pot 15. The invention includes a plurality of tabs 66 extending from an inside surface of the saucer 45 for engaging the plurality of locking apertures 36 to interlock the saucer and the pot.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A lockable vegetation pot and saucer, comprising in combination:

a plastic pot having a pot base with a drain aperture therein and integral pot sides diverging from said pot base;

a plurality of pot legs extending from said pot base at a spaced distance from the other perimeter of said pot base;

a plurality of pot stops extending from the inside surface of said pot sides a distance less than said spaced distance of said pot legs;

whereby the angle of said diverging pot sides enables stacking of said pot with similar pots with said pot base engaging said pot stops of an adjacent similar pot;

a plurality of locking apertures in said pot sides each aperture having a locking side adjacent said pot base with said plurality of locking apertures in said sides being respectively adjacent said plurality of pot legs depending from said pot base;

a plastic saucer having a saucer base and integral saucer sides diverging from said saucer base;

a plurality of saucer stops extending from the inside of said saucer;

whereby the angle of said diverging saucer sides enables stacking of said saucer with similar saucers with said saucer engaging said saucer stops of an adjacent similar saucer;

and a plurality of tabs extending inwardly from the inside of said saucer sides with each tab having a ramp surface and a locking surface whereby said ramp surface causes progressive deformation of said saucer sides upon insertion of said pot into said saucer until said locking surfaces of said tabs engage said locking sides of said locking apertures to resiliently hold said pot legs against said saucer base.

2. A structure as set forth in claim 1, including a plurality of saucer legs extending from said saucer base for supporting said pot and saucer.

3. A structure as set forth in claim 1, wherein said pot and saucer each has a rim of increased wall thickness at the top of said pot and saucer sides, respectively.

4. A structure as set forth in claim 1, wherein said pot and saucer sides each have a first and a second side portion with said first side portion having an increased crosssectional area relative to said second side portion and extending to the top of said pot and saucer sides with a pot and a saucer shoulder between said first and second side portions, respectively.

5. A lockable vegetation pot and saucer, comprising in combination:

a plastic pot having a pot base with a plurality of apertures therein and integral pot sides diverging from said pot base, a minor portion of said pot sides having an increased crosssectional area extending to the top of said pot sides with a pot shoulder between said minor portion and a major portion of said pot sides;

said pot having a pot rim of increased wall thickness at said top of said pot sides;

a plurality of pot legs extending from said pot base at a spaced distance from the outer perimeter of said pot base;

a plurality of pot stops extending from the inside surface of said pot sides a distance less than said spaced distance of said pot legs; whereby the angle of said diverging pot sides enables stacking of said pot with similar pots with said pot base engaging said pot stops of an adjacent similar pot;

a plurality of uniformly distributed rectangular locking apertures in said pot sides each aperture having a locking side adjacent said pot base with said plurality of locking apertures being respectively adjacent said plurality of pot legs;

a plastic saucer having a saucer base and integral saucer sides diverging from said saucer base, a major portion of said saucer sides having an increased cross sectional area extending to the top of said saucer sides with a saucer shoulder between said major portion and a minor portion of said saucer sides;

said saucer having a saucer rim of increased wall thickness at sait top of said saucer sides;

a plurality of saucer legs extending from said saucer base at a spaced distance from the outer perimeter of said saucer base;

a plurality of saucer stops extending from the inside surface of said saucer sides a distance less than said space distance of said saucer legs; whereby the angle of said diverging saucer sides enables stacking of said saucer with similar saucers with said saucer shoulder engaging said saucer stops of an adjacent similar saucer;

a plurality of tabs each having a length substantially equal to the length of said locking side of said retangular apertures and extending inwardly from the inside surface of said saucer; and each of said tabs having a ramp surface extending upwardly and outwardly and a locking surface extending downwardly and outwardly whereby said ramp surfaces cause progressive deformation of said saucer until said locking surfaces of said tabs engage said locking sides of said locking apertures to resiliently hold said pot legs against said saucer base.

\* \* \* \* \*